US010686595B2

(12) United States Patent
Chimakurthy et al.

(10) Patent No.: US 10,686,595 B2
(45) Date of Patent: Jun. 16, 2020

(54) CONFIGURING CONNECTIVITY ASSOCIATION KEY AND CONNECTIVITY ASSOCIATION NAME IN A MEDIA ACCESS CONTROL SECURITY CAPABLE DEVICE

(71) Applicant: Hewlett Packard Enterprise Development LP, Houston, TX (US)

(72) Inventors: Sudhir Kumar Chimakurthy, Bengaluru (IN); Chaitanya Kumar Gali, Bangalore (IN); Dileep Bangalore Sridhara, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 247 days.

(21) Appl. No.: 15/816,400

(22) Filed: Nov. 17, 2017

(65) Prior Publication Data
US 2019/0158279 A1    May 23, 2019

(51) Int. Cl.
*H04L 9/08* (2006.01)
*H04L 29/06* (2006.01)
*H04L 9/32* (2006.01)

(52) U.S. Cl.
CPC .......... *H04L 9/0825* (2013.01); *H04L 9/3226* (2013.01); *H04L 9/3263* (2013.01);
(Continued)

(58) Field of Classification Search
CPC ............... H04L 9/0852; H04L 63/0442; H04L 63/0869; H04L 63/0876; H04L 63/162;
(Continued)

(56) References Cited

U.S. PATENT DOCUMENTS 8,385,552 B2  2/2013  Weis
8,966,265 B2  2/2015  Ho
(Continued)

FOREIGN PATENT DOCUMENTS

| CN | 101282208 | 10/2008 |
| CN | 103209072 | 7/2013 |
| CN | 103312495 | 9/2013 |

OTHER PUBLICATIONS

IEEE, "802.1X-2010—IEEE Standard for Local and metropolitan area networks-Port-Based Network Access Control", Revision of IEEE Std 802.1X-2004 (Revision of IEEE Std 802.1X-2001), 2010, 222 pages.
(Continued)

*Primary Examiner* — Paul E Callahan
(74) *Attorney, Agent, or Firm* — Hewlett Packard Enterprise Patent Department

(57) ABSTRACT

Examples disclosed herein relate to configuring a connectivity association key and a connectivity association name in a MACsec capable device. In an example, a first MACsec device may receive a MAC address and a device identifier of a second MACsec capable device. First MACsec capable device may authenticate the second MACsec capable device based on the device identifier. First MACsec capable device may generate a CAK, a CKN, and a nonce. The CAK, the CKN, and the nonce may be encrypted using a public key of the second MACsec capable device to generate an encrypted packet. The encrypted packet may be sent to the second MACsec capable device. The first MACsec capable device may receive a decrypted nonce from the second MACsec capable device. In response to a determination that the decrypted nonce matches with the nonce, CAK and CKN may be configured on first MACsec capable device.

19 Claims, 4 Drawing Sheets

(52) U.S. Cl.
CPC ...... *H04L 63/0442* (2013.01); *H04L 63/0823* (2013.01); *H04L 63/0869* (2013.01); *H04L 63/0876* (2013.01)

(58) Field of Classification Search
CPC ........... H04W 12/04031; H04W 12/06; H04W 12/0407; H04W 12/04033
See application file for complete search history.

(56) References Cited

U.S. PATENT DOCUMENTS

| | | |
|---|---|---|
| 9,270,651 B2 | 2/2016 | Sun et al. |
| 2009/0190764 A1 | 7/2009 | Liu |
| 2015/0365409 A1 | 12/2015 | Mohamed et al. |

OTHER PUBLICATIONS

"Junos® OS for EX Series Ethernet Switches: Port Security Feature Guide for EX Series Switches", Juniper Networks, Inc., Sep. 29, 2017, 340 pages.
Anand G S, et al., "Linux Based Implementation of MACSec Key Agreement (MKA)", International Journal of Engineering Research and Development, Institute of Technology, Bangalore, India, Sep. 2012, 6 pages.
Configuring Media Access Control Security (MACsec), (Research Paper), Oct. 3, 2013, 13 Pgs.
Weis, Brian, "Overview of IEEE 802.1X-REV Dynamic Session Key Agreement", IETF, 2006, 19 pages.
Weis, Brian, "Security Considerations and Proposal for MACsec Key Establishment", IEEE, May 15, 2006, 18 pages.

CONFIGURING CONNECTIVITY ASSOCIATION KEY AND CONNECTIVITY ASSOCIATION NAME IN A MEDIA ACCESS CONTROL SECURITY CAPABLE DEVICE

BACKGROUND

Media Access Control Security (MACsec) is a technology that may provide secure communication on Ethernet links. MACsec may allow unauthorized Local Area Network (LAN) connections to be identified and excluded from communication within a network. MACsec may provide data confidentiality, data integrity and data origin authentication on Ethernet links between nodes.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
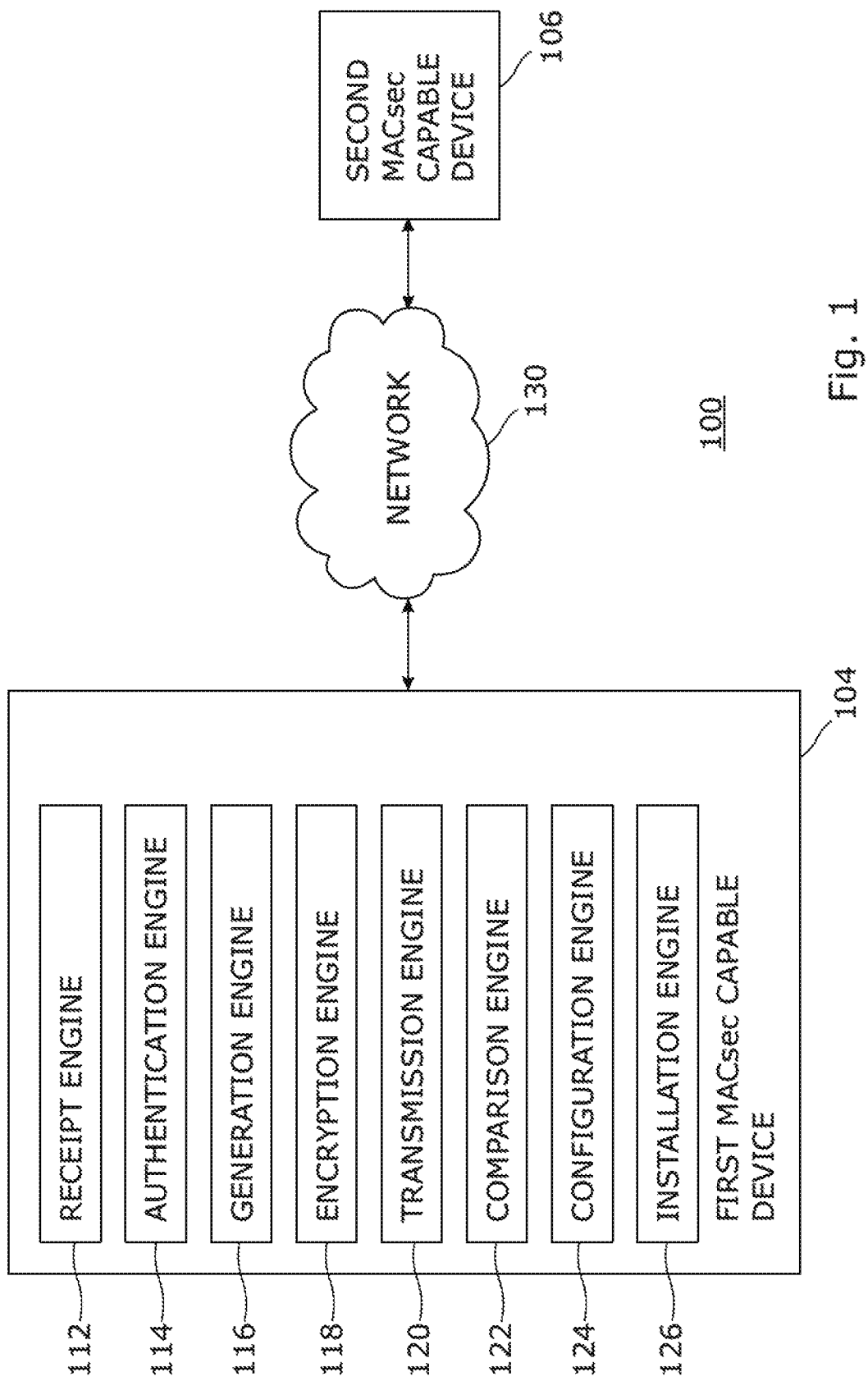
FIG. 1 illustrates a block diagram of an example computing environment for configuring a connectivity association key and a connectivity association name in a MACsec capable device.

Media Access Control security (MACsec) is an IEEE 802 standard that specifies how to secure a LAN or a part thereof at the link layer. MACsec executes the encryption function in the physical layer (PHY) of an Ethernet port and offers encryption equal to that of the Ethernet port rates bi-directionally regardless of the packet size. MACsec may secure participating entities (for example, network devices) using the MACsec Key Agreement (MKA) protocol.

Enterprises are increasingly focusing on securing networks from the inside, and MACsec as layer 2 security protocol may help fill this gap. To ensure the security of wired networks, it may be desirable to implement the MACsec functionality on newer generation of network infrastructure switches. The identification of MACsec participants in a network may be determined by a set of keys: Connectivity Association Key (CAK) and Connectivity Association Name (CKN). These keys are used by the MACsec Key agreement protocol for establishing a MACsec session(s). In order for two MACsec capable devices to communicate, the same CAK and CKN keys must be configured on both devices.

An approach to configuring CAK and CKN on a MACsec enabled system may include manually configuring a CAK and CKN on the MACsec enabled device, for example, via a command line interface or a GUI. However, there are multiple challenges involved in a manual configuration of CAK and CKN. The administrator is expected to configure and choose a robust and random key (CAK and CKN) on the devices. The administrator also is expected to keep track of the keys used on one device so that he/she must use the same key on the other device. A network topology may consist of many MACsec capable systems. The administrator is expected to configure different CAK and CKN on different pairs of systems in order to compartmentalize the security breach in case one of the CAK and CKN gets compromised. Since manual configuration is performed, there are possibilities of weak or wrong keys getting configured due to human fatigue or error. Needless to say, these are not desirable scenarios as enterprises increasingly migrate towards cloud deployments expecting auto provisioning of devices with more security.

To address these issues, the present disclosure describes various examples for configuring a connectivity association key and a connectivity association name in a MACsec capable device. In an example, a first MACsec device may receive a MAC address and a device identifier of a second MACsec capable device from the second MACsec capable device. The first MACsec capable device may authenticate the second MACsec capable device based on the device identifier of the second MACsec capable device. The first MACsec capable device may generate a Connectivity Association Key (CAK), a Connectivity Association Name (CKN), and a nonce. The first MACsec capable device may encrypt the CAK, the CKN, and the nonce using a public key of the second MACsec capable device to generate an encrypted packet. The first MACsec capable device may send the encrypted packet to the second MACsec capable device. The encrypted packet may be useable by the second MACsec capable device to configure the CAK and the CKN on the second MACsec capable device by decrypting the encrypted packet using a private key corresponding to the public key of the second MACsec capable device. The first MACsec capable device may receive a decrypted nonce from the second MACsec capable device. The decrypted nonce may be generated by decrypting the encrypted packet on the second MACsec capable device. The first MACsec capable device may compare the decrypted nonce from the second MACsec capable device with the nonce on the first MACsec capable device. In response to a determination that the decrypted nonce matches with the nonce, the first MACsec capable device may configure the CAK and the CKN on the first MACsec capable device.

FIG. 1 illustrates a block diagram of an example computing environment 100 for configuring a connectivity association key and a connectivity association name in a MACsec capable device. The computing environment 100 may include a first MACsec capable device 104 and a second MACsec capable device 106. Although two MACsec capable devices are shown in FIG. 1, other examples of this disclosure may include more than two MACsec capable devices.

In an example, first MACsec capable device 104 and second MACsec capable device 106 may each be a network device. For example, first MACsec capable device 104 and second MACsec capable device 106 may each be a network switch, a network router, a virtual switch, and a virtual router.

First MACsec capable device 104 and second MACsec capable device 106 may be communicatively coupled, for example, via a computer network 130. Computer network 130 may include, for example, a Local Area Network (LAN), and a Wireless Local Area Network (WAN). In an example, first MACsec capable device 104 and second MACsec capable device 106 may be point-to-point devices.

As used herein, a "MACsec capable device" may include a device that supports MACsec. As mentioned earlier, MACsec is the IEEE 802.1AE standard for authenticating and encrypting packets between two MACsec-capable devices (for example, 104 and 106). A MACsec capable device (for example, 104 and 106) may support 802.1AE encryption with MACsec Key Agreement (MKA) on downlink ports for encryption between the MACsec device and a host device.

MACsec standard may provide MAC-layer encryption over wired networks by using out-of-band methods for encryption keying. MACsec standard may include several protocols. These may include, for example, Extensible Authentication Protocol (EAP), MACsec Key Agreement (MKA) protocol, Security Association Protocol (SAP), EAP over LAN (EAPOL), Remote Authentication Dial-In User Service (RADIUS) protocol, etc.

The MKA protocol manages the encryption keys used by the MACsec protocol. The MKA protocol allows peer discovery with confirmation of mutual authentication and sharing of MACsec secret keys to protect data exchanged by the peers.

A Connectivity Association (CA) may be a logical association between two or more MACsec participating entities (for example, network devices). A secure Connectivity Association (CA) may be defined as a security relationship, established and maintained by key agreement protocols, that comprises a fully connected subset of the service access points in stations attached to a single LAN that are to be supported by MACsec. Members of a CA may be identified via a secret key called as secure Connectivity Association Key (CAK). A CAK may be identified via a secure Connectivity Association Key Name (CKN), which may be of 1 to 32 octets. Only entities with same pair of CAK and CKN may be able to form a CA.

A CA may be realized via Secure Channels (SC) between two or more MACsec entities participating in a CA. A secure channel" may refer to a security relationship used to provide security guarantees for frames transmitted from one member of a CA to the others. There may be one SC ("Transmit SC") for secure transmission of frames from a MACsec entity to all other devices in a CA. However, there may be one or multiple SCs ("Receive SCs") for receiving frames from other devices in a CA. Each SC may be identified via a Secure Channel Identifier (SCI), which may be a globally unique identifier for a secure channel, comprising a globally unique MAC Address and a Port Identifier, unique within the system that has been allocated that address. A SC remains alive until the two entities participate in the MACsec CA.

Using the MKA protocol, the CKN may be exchanged to authenticate each participant mutually and the MKA protocol may maintain MACsec on the link. The MKA protocol may be used to select one of the two participants on the point-to-point link as Key Server. The Key Server then creates a randomized encryption key (SAK) that is shared in a secure manner with the other participant. The Key Server may continue to periodically (until a packet number limit is reached) create and share a new randomly generated SAK over the point-to-point link as long as MACsec secure connectivity is maintained.

In some examples, at least one of the MACsec capable devices 104 or 106 may include a receipt engine 112, an authentication engine 114, a generation engine 116, an encryption engine 118, a transmission engine 120, a comparison engine 122, a configuration engine 124, and an installation engine 126. For the sake of simplicity in illustration, first MACsec capable device 104 is shown to include receipt engine, authentication engine, generation engine, encryption engine, transmission engine, comparison engine, configuration engine, and installation engine. However, any other MACsec capable device (for example, second MACsec capable device 106) in the computing environment 100 may include these engines as well.

Engines 112, 114, 116, 118, 120, 122, 124, and 126 may include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of MACsec capable device (for example, 104 and 106). In some examples, the at least one machine-readable storage medium may store instructions that, when executed by the at least one processing resource, at least partially implement some or all engines of the computing device. In such examples, MACsec capable device (for example, 104 and 106) may include the at least one machine-readable storage medium storing the instructions and the at least one processing resource to execute the instructions.

In an example, first MACsec capable device 104 and second MACsec capable device 106 may share their respective MAC addresses and device identifiers with each other. For example, receipt engine on first MACsec capable device 104 may receive a MAC address and a device identifier of second MACsec capable device 106 from the second MACsec capable device 106, for example, via an Ethernet packet.

In an example, the device identifier of second MACsec capable device 106 may be based on a hardware-based Trusted Platform Module (TPM). A hardware-based TPM may include a tamper-resistant integrated circuit built into a motherboard of a system that may perform cryptographic operations (for example, key generation), and may include artifacts that may be used to authenticate a firmware component. These artifacts may include, for example, certificates, passwords and encryption keys. In an example, the hardware-based TPM may be based on a standard specification, such as the specification published by the Trusted Computing Group (for example, TPM 1.2 or TPM 2.0 specification).

The device identifier of second MACsec capable device 106 may include a unique identity installed at manufacturing time, which may be used subsequently in device-to-device authentication exchanges. For example, the device identifier may include a cryptographic identity that is bound to a device and used to assert the device's identity. An IDevID may be created at manufacturing time and provides evidence that this device has been manufactured by a certain manufacturer.

In an example, the device identifier of second MACsec capable device 106 may include a digital certificate. The digital certificate may include a public key of second MACsec capable device 106. In an example, the digital certificate may include an initial device identifier (IDevID) certificate.

In an example, a public key infrastructure (PKI) may be used for the creation, storage, and distribution of the digital certificate which is used to verify that a particular public key belongs to a certain entity (for example, first MACsec capable device 104 or second MACsec capable device 106). A PKI may include a certificate authority (CA) that stores, issues and signs a digital certificate. PKI uses a technology called asymmetric cryptography. The asymmetric cryptography relies on two separate keys: a private key and a public key, to both lock and unlock a message. A private key is a number generated by a special mathematical function and is the main tool used to create a digital signature. It is known only to the person who generates it, and should be kept secret. A public key is a number that allows another person to "unlock" a signature in order to validate both the document and the signer's identity. The public key is generated with the private key and the two are mathematically related. Because of the nature of the key generation algorithms, it is virtually impossible to deduce the private key from the public key or its signature. Together, a private key and a public key constitute a key pair. The public key may not be kept secret and is typically published in the form of a digital certificate.

A digital certificate is like a digital identity card that can contain an assortment of information such as the name and address of the certificate holder, the holder's public key, the certificate's date of issue and expiration, a validation stamp by the agency issuing the certificate etc. It may be issued by a certification authority (CA). Once a certificate is issued, the certificate holder can sign a digital document by using their private key. The digital signature is embedded within the original document and can be verified by using the public key corresponding to the private key.

In response to receiving the device identifier, authentication engine may authenticate second MACsec capable device 106 based on the device identifier of second MACsec capable device 106. In an example, the authentication may include, for example, validating the date on the device identifier, and determining whether the device identifier is signed by a trusted CA. The authentication may be performed by using a pre-installed certificate of the CA that issued the device identifier (for example, a digital certificate) of second MACsec capable device 106. If the device identifier is not valid, authentication engine may show an error and no MACsec session may be realized between first MACsec capable device 104 and second MACsec capable device 106.

Transmission engine may provide a MAC address and a device identifier of first MACsec capable device 104 to second MACsec capable device 106. In an example, the device identifier of first MACsec capable device 104 may include a digital certificate. The digital certificate may include a public key of first MACsec capable device 104. In an example, the digital certificate may include an IDevID certificate.

The MAC address and the device identifier of first MACsec capable device 104 may be used by second MACsec capable device 106 to authenticate first MACsec capable device 104. The authentication mechanism used may be similar to the one described earlier for first MACsec capable device 104.

In response to authentication of second MACsec device by authentication engine, generation engine may generate a random Connectivity Association Key (CAK), a Connectivity Association Name (CKN), and a nonce. In an example, this may include comparing the MAC address of first MACsec capable device 104 with the MAC address of second MACsec capable device 106. In response to a determination that the MAC address of first MACsec capable device 104 is lower than the MAC address of second MACsec capable device 106, first MACsec capable device 104 may be elected as a key server, which may then generate the CAK, the CKN, and the nonce. The nonce may include an arbitrary number that may only be used once. The nonce may be for example, a random or a pseudo-random number.

Once the CAK, the CKN, and the nonce are generated by generation engine, encryption engine may encrypt the CAK, the CKN, and the nonce using a public key of second MACsec capable device 106 to generate an encrypted packet. Encryption engine may extract the public key of second MACsec capable device 106 from the device identifier of second MACsec capable device 106. In an example, the encrypted packet may include an encrypted Ethernet packet.

Once the encrypted packet is generated by encryption engine, transmission engine may send the encrypted packet to second MACsec capable device 106. On receipt, second MACsec capable device 106 may decrypt the encrypted packet using a private key corresponding to the public key of second MACsec capable device 106. Decryption of the encrypted packet would decrypt the CAK, the CKN, and the nonce on second MACsec capable device 106. Second MACsec capable device 106 may then configure the CAK and the CKN on second MACsec capable device 106, and send the decrypted nonce to first MACsec capable device 104.

Receipt engine on first MACsec capable device 104 may receive the decrypted nonce from second MACsec capable device 106. In an example, the decrypted nonce may be received in plain text. In response, comparison engine may compare the decrypted nonce from second MACsec capable device 106 with the nonce on first MACsec capable device 104. In response to a determination that the decrypted nonce matches with the nonce, configuration engine may configure the CAK and the CKN on first MACsec capable device 104. Once the CAK and the CKN are configured on first MACsec capable device 104, installation engine may establish a MACsec session with second MACsec capable device 106. In an example, establishing a MACsec session may include initiating, by first MACsec capable device 104, the MACsec key agreement protocol with second MACsec capable device 106.

Mutual peer authentication may take place between first MACsec capable device 104 and second MACsec capable device 106 by configuring the same CAK, as described earlier. On successful peer authentication, a connectivity association may be formed between the peers, and the MKA protocol may enable and maintain a MACsec link between the two devices.

Figure 2:
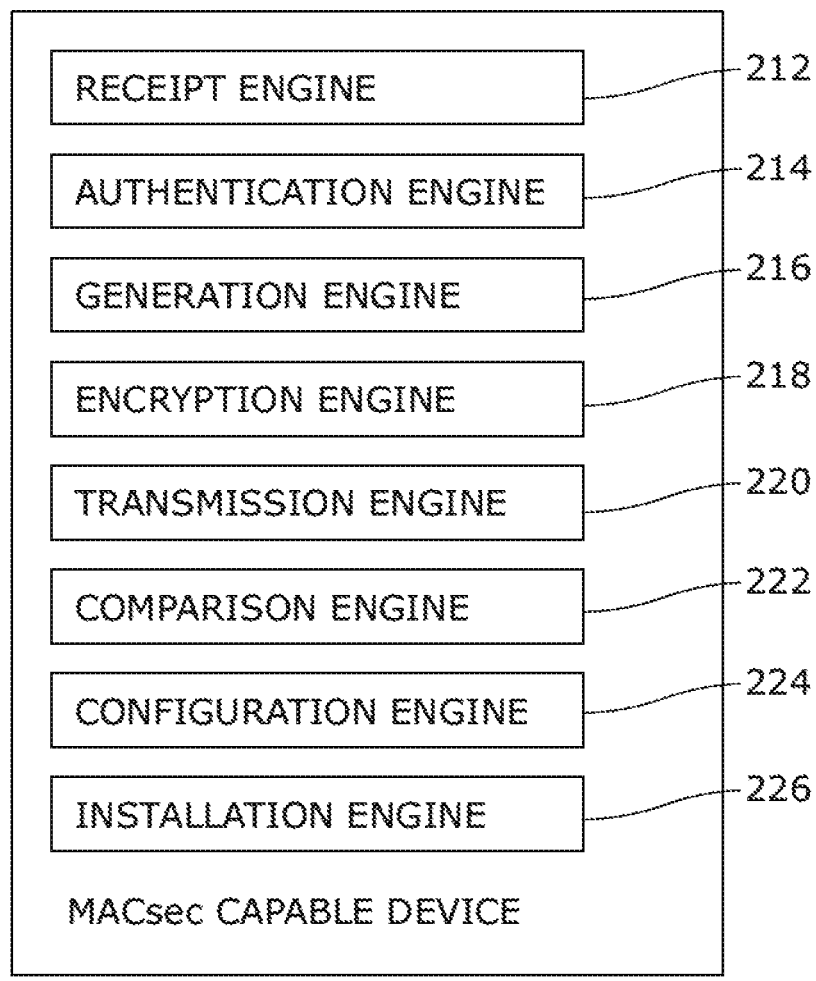
FIG. 2 is a bock diagram of an example MACsec capable device for configuring a connectivity association key and a connectivity association name.

FIG. 2 is a bock diagram of an example MACsec capable device 200 for configuring a connectivity association key and a connectivity association name. In an example, MACsec capable device 200 may be analogous to MACsec capable device 104 or 106 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, MACsec capable device 200 may be a network device. For example, MACsec capable device 200 may be a network switch, a network router, a virtual switch, and a virtual router. In another example, MACsec capable device 200 may be a computing device capable of executing machine-readable instructions.

In an example, MACsec capable device 200 may include a receipt engine 212, an authentication engine 214, a generation engine 216, an encryption engine 218, a transmission engine 220, a comparison engine 222, a configuration engine 224, and an installation engine 226. In an example, the aforementioned engines may perform functionalities similar to those described for receipt engine 112, authentication engine 114, generation engine 116, encryption engine 118, transmission engine 120, comparison engine 122, configuration engine 124, and installation engine 126 respectively.

In an example, receipt engine 212 may receive a MAC address and a device identifier of a second MACsec capable device (for example, 106) from the second MACsec capable device. Authentication engine 214 may authenticate the second MACsec capable device based on the device identifier of the second MACsec capable device. Generation engine 216 may generate a Connectivity Association Key (CAK), a Connectivity Association Name (CKN), and a nonce. Encryption engine 218 may encrypt the CAK, the CKN, to generate an encrypted packet. Transmission engine 220 may send the encrypted packet to the second MACsec capable device. The encrypted packet may be useable by the second MACsec capable device to configure the CAK and the CKN on the second MACsec capable device. Second MACsec capable device may decrypt the encrypted packet using a private key corresponding to the public key of second MACsec capable device. Decryption of the encrypted packet would decrypt the CAK, the CKN, and the nonce on second MACsec capable device. Second MACsec capable device may then configure the CAK and the CKN on second MACsec capable device, and send the decrypted nonce to MACsec capable device 200.

Receipt engine 212 may receive a decrypted nonce from the second MACsec capable device. Comparison engine 222 may compare the decrypted nonce from the second MACsec capable device with the nonce on the MACsec capable device. In response to a determination that the decrypted nonce matches with the nonce, configuration engine 224 may configure the CAK and the CKN on the MACsec capable device. Installation engine 226 may establish a MACsec session with the second MACsec capable device.

Figure 3:
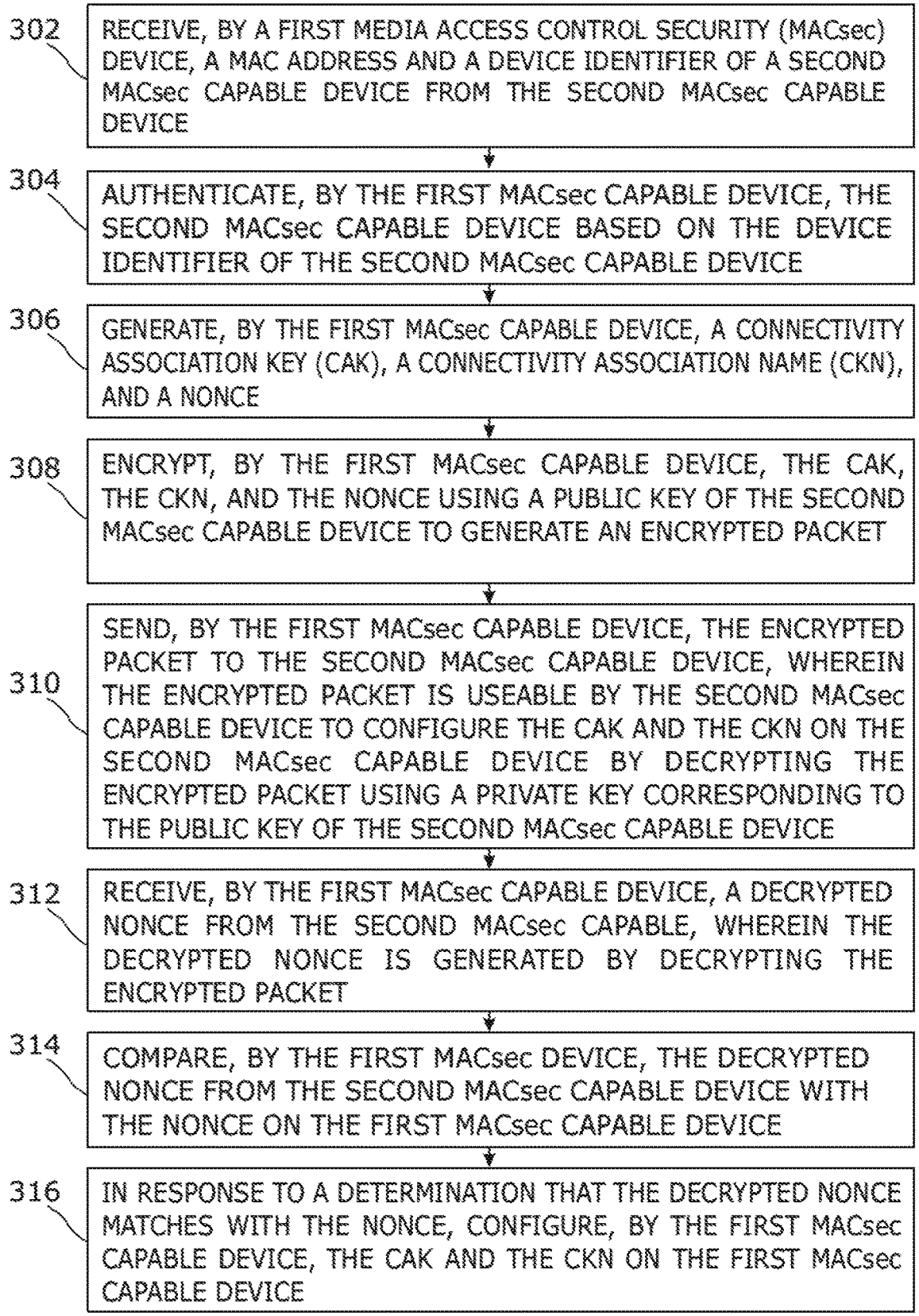
FIG. 3 is a flow chart of an example method of configuring a connectivity association key and a connectivity association name in a MACsec capable device.

FIG. 3 is a flow chart of an example method 300 of configuring a connectivity association key and a connectivity association name in a MACsec capable device. The method 300, which is described below, may be fully or partially executed on a computing device such as MACsec capable devices 104 and 106 of FIG. 1 or 200 of FIG. 2. However, other suitable computing devices may execute method 300 as well.

At block 302, a first Media Access Control Security (MACsec) device may receive a MAC address and a device identifier of a second MACsec capable device from the second MACsec capable device. At block 304, the first MACsec capable device may authenticate the second MACsec capable device based on the device identifier of the second MACsec capable device. At block 306, the first MACsec capable device may generate a Connectivity Association Key (CAK), a Connectivity Association Name (CKN), and a nonce. At block 308, the first MACsec capable device may encrypt the CAK, the CKN, and the nonce using a public key of the second MACsec capable device to generate an encrypted packet. At block 310, the first MACsec capable device may send the encrypted packet to the second MACsec capable device. The encrypted packet may be useable by the second MACsec capable device to configure the CAK and the CKN on the second MACsec capable device by decrypting the encrypted packet using a private key corresponding to the public key of the second MACsec capable device. At block 312, the first MACsec capable device may receive a decrypted nonce from the second MACsec capable device. The decrypted nonce may generated by decrypting the encrypted packet on the second MACsec capable device. At block 314, the first MACsec capable device may compare the decrypted nonce from the second MACsec capable device with the nonce on the first MACsec capable device. At block 316, in response to a determination that the decrypted nonce matches with the nonce, the first MACsec capable device may configure the CAK and the CKN on the first MACsec capable device.

Figure 4:
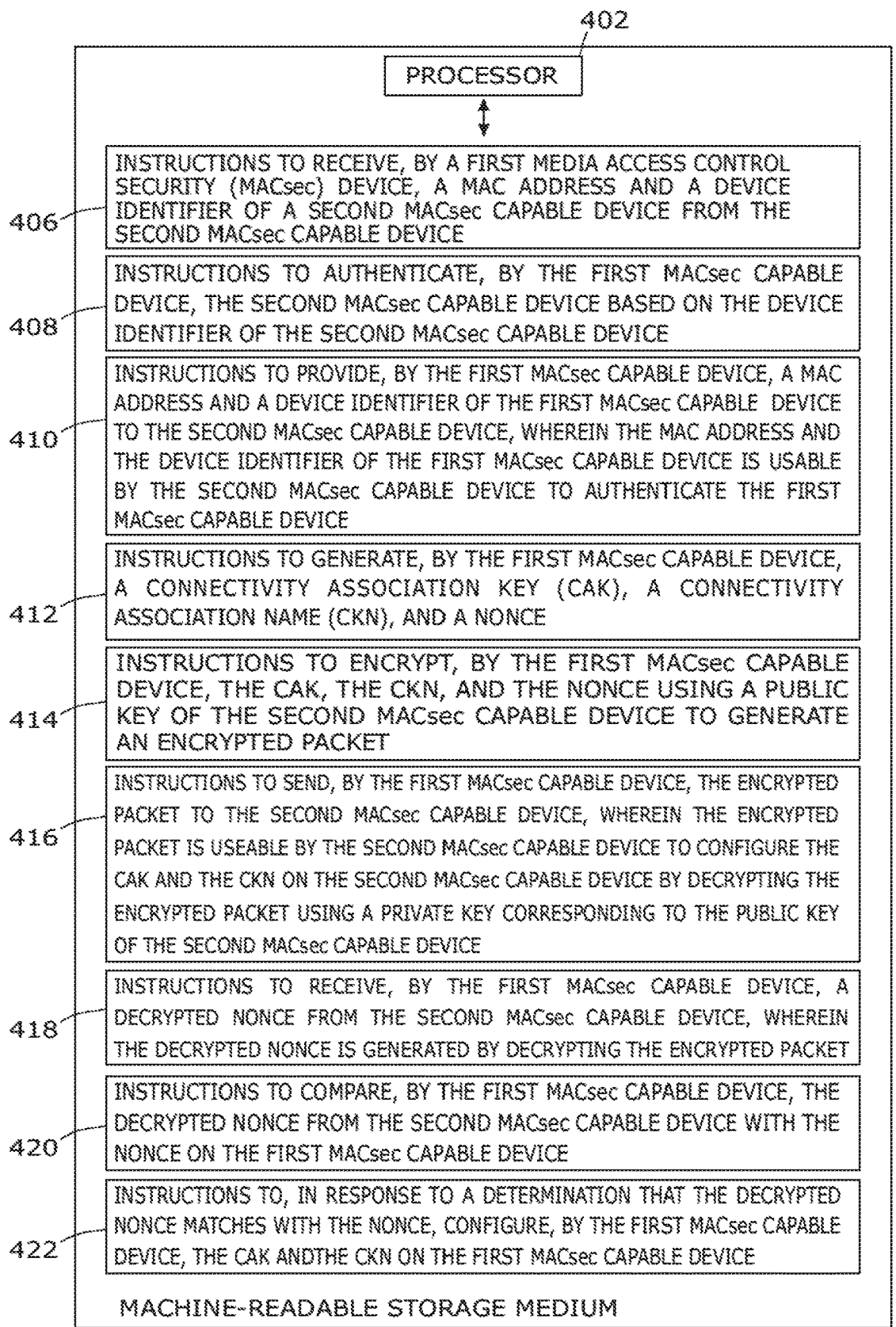
FIG. 4 is a block diagram of an example system including instructions in a machine-readable storage medium for configuring a connectivity association key and a connectivity association name in a MACsec capable device.

FIG. 4 is a block diagram of an example system 400 including instructions in a machine-readable storage medium for configuring a connectivity association key and a connectivity association name in a MACsec capable device. System 400 includes a processor 402 and a machine-readable storage medium 404 communicatively coupled through a system bus. In an example, system 400 may be analogous to MACsec capable device 104 or 106 of FIG. 1, or MACsec capable device 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, 410, 412, 414, 416, 418, 420, and 422.

In an example, instructions 406 may be executed by processor 402 to receive, by a first Media Access Control Security (MACsec) device, a MAC address and a device identifier of a second MACsec capable device from the second MACsec capable device. Instructions 408 may be executed by processor 402 to authenticate, by the first MACsec capable device, the second MACsec capable device based on the device identifier of the second MACsec capable device. Instructions 410 may be executed by processor 402 to provide, by the first MACsec capable device, a MAC address and a device identifier of the first MACsec capable device to the second MACsec capable device. The MAC address and the device identifier of the first MACsec capable device may be usable by the second MACsec capable device to authenticate the first MACsec capable device.

Instructions 412 may be executed by processor 402 to generate, by the first MACsec capable device, a Connectivity Association Key (CAK), a Connectivity Association Name (CKN), and a nonce. Instructions 414 may be executed by processor 402 to encrypt, by the first MACsec capable device, the CAK, the CKN, and the nonce using a public key of the second MACsec capable device to generate an encrypted packet. Instructions 416 may be executed by processor 402 to send, by the first MACsec capable device, the encrypted packet to the second MACsec capable device. The encrypted packet may be useable by the second MACsec capable device to configure the CAK and the CKN on the second MACsec capable device by decrypting the encrypted packet using a private key corresponding to the public key of the second MACsec capable device.

Instructions 418 may be executed by processor 402 to receive, by the first MACsec capable device, a decrypted nonce from the second MACsec capable device, wherein the decrypted nonce is generated by decrypting the encrypted packet. Instructions 420 may be executed by processor 402 to compare, by the first MACsec capable device, the decrypted nonce from the second MACsec capable device with the nonce on the first MACsec capable device. Instructions 422 may be executed by processor 402 to configure, by the first MACsec capable device, the CAK and the CKN on the first MACsec capable device, in response to a determination that the decrypted nonce matches with the nonce.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the stages of any method or process so disclosed, may be combined in any combination, except combinations where at least some of such features and/or stages are mutually exclusive.

The invention claimed is:

1. A method comprising:
receiving, by a first Media Access Control Security (MACsec) device, a MAC address and a device identifier of a second MACsec capable device from the second MACsec capable device;
authenticating, by the first MACsec capable device, the second MACsec capable device based on the device identifier of the second MACsec capable device;
generating, by the first MACsec capable device, a Connectivity Association Key (CAK), a Connectivity Association Name (CKN), and a nonce;
encrypting, by the first MACsec capable device, the CAK, the CKN, and the nonce using a public key of the second MACsec capable device to generate an encrypted packet;
sending, by the first MACsec capable device, the encrypted packet to the second MACsec capable device, wherein the encrypted packet is useable by the second MACsec capable device to configure the CAK and the CKN on the second MACsec capable device by decrypting the encrypted packet using a private key corresponding to the public key of the second MACsec capable device;
receiving, by the first MACsec capable device, a decrypted nonce from the second MACsec capable device, wherein the decrypted nonce is generated by decrypting the encrypted packet using the private key corresponding to the public key of the second MACsec capable device;
comparing, by the first MACsec capable device, the decrypted nonce from the second MACsec capable device with the nonce on the first MACsec capable device; and
in response to a determination that the decrypted nonce matches with the nonce, configuring, by the first MACsec capable device, the CAK and the CKN on the first MACsec capable device.

2. The method of claim 1, further comprising:
establishing, by the first MACsec capable device, a MACsec session with the second MACsec capable device.

3. The method of claim 1, further comprising:
providing, by the first MACsec capable device, a MAC address and a device identifier of the first MACsec capable device to the second MACsec capable device, wherein the MAC address and the device identifier of the first MACsec capable device is usable by the second MACsec capable device to authenticate the first MACsec capable device.

4. The method of claim 1, wherein encrypting comprises:
extracting, by the first MACsec capable device, the public key from the device identifier of the second MACsec capable device.

5. The method of claim 1, wherein generating comprises:
comparing, by the first MACsec capable device, the MAC address of the first MACsec capable device with the MAC address of the second MACsec capable device; and
in response to a determination that the MAC address of the first MACsec capable device is lower than the MAC address of the second MACsec capable device, generating, by the first MACsec capable device, the CAK, the CKN, and the nonce.

6. The method of claim 1, wherein the device identifier of the first MACsec capable device is a digital certificate of the first MACsec capable device and wherein the device identifier of the second MACsec capable device is a digital certificate of the second MACsec capable device.

7. A Media Access Control Security (MACsec) device comprising:
a processing resource; and
a non-transitory machine readable medium comprising instructions, the instructions executable by a processor to:
receive a MAC address and a device identifier of a second MACsec capable device from the second MACsec capable device;
authenticate the second MACsec capable device based on the device identifier of the second MACsec capable device;
generate a Connectivity Association Key (CAK), a Connectivity Association Name (CKN), and a nonce;
encrypt the CAK, the CKN, and the nonce using a public key of the second MACsec capable device to generate an encrypted packet;
send the encrypted packet to the second MACsec capable device, wherein the encrypted packet is useable by the second MACsec capable device to configure the CAK and the CKN on the second MACsec capable device by decrypting the encrypted packet using a private key corresponding to the public key of the second MACsec capable device;

receive a decrypted nonce from the second MACsec capable device, wherein the decrypted nonce is generated by decrypting the encrypted packet using the private key corresponding to the public key of the second MACsec capable device;

compare the decrypted nonce from the second MACsec capable device with the nonce on the MACsec capable device;

configure the CAK and the CKN on the MACsec capable device, in response to a determination that the decrypted nonce matches with the nonce; and establish a MACsec session with the second MACsec capable device.

8. The device of claim 7, wherein the public key is present in the device identifier of the second MACsec capable device.

9. The device of claim 7, wherein the installation engine is to establish the MACsec session by initiating MACsec key agreement protocol with the second MACsec capable device.

10. The device of claim 7, wherein the decrypted nonce is received in plain text.

11. The device of claim 7, wherein the device identifier of the second MACsec capable device is an IDevID certificate.

12. The device of claim 7, wherein the second MACsec capable device includes one of a network switch and a network router.

13. A non-transitory machine-readable storage medium comprising instructions, the instructions executable by a processor to:

receive, by a first Media Access Control Security (MACsec) device, a MAC address and a device identifier of a second MACsec capable device from the second MACsec capable device;

authenticate, by the first MACsec capable device, the second MACsec capable device based on the device identifier of the second MACsec capable device;

provide, by the first MACsec capable device, a MAC address and a device identifier of the first MACsec capable device to the second MACsec capable device, wherein the MAC address and the device identifier of the first MACsec capable device is usable by the second MACsec capable device to authenticate the first MACsec capable device;

generate, by the first MACsec capable device, a Connectivity Association Key (CAK), a Connectivity Association Name (CKN), and a nonce;

encrypt, by the first MACsec capable device, the CAK, the CKN, and the nonce using a public key of the second MACsec capable device to generate an encrypted packet;

send, by the first MACsec capable device, the encrypted packet to the second MACsec capable device, wherein the encrypted packet is useable by the second MACsec capable device to configure the CAK and the CKN on the second MACsec capable device by decrypting the encrypted packet using a private key corresponding to the public key of the second MACsec capable device;

receive, by the first MACsec capable device, a decrypted nonce from the second MACsec capable device, wherein the decrypted nonce is generated by decrypting the encrypted packet using the private key corresponding to the public key of the second MACsec capable device;

compare, by the first MACsec capable device, the decrypted nonce from the second MACsec capable device with the nonce on the first MACsec capable device; and in response to a determination that the decrypted nonce matches with the nonce, configure, by the first MACsec capable device, the CAK and the CKN on the first MACsec capable device.

14. The storage medium of claim 13, wherein the first MACsec capable device and the second MACsec capable device are point-to-point devices.

15. The storage medium of claim 13, wherein the instructions to generate comprise instructions to:

compare, by the first MACsec capable device, the MAC address of the first MACsec capable device with the MAC address of the second MACsec capable device;

in response to a determination that the MAC address of the first MACsec capable device is lower than the MAC address of the second MACsec capable device, elect, by the first MACsec capable device, the first MACsec capable device as a key server; and generate, by the first MACsec capable device, the CAK, the CKN, and the nonce.

16. The storage medium of claim 13, wherein the private key is present in the device identifier of the second MACsec capable device.

17. The storage medium of claim 13, wherein the device identifier of the first MACsec capable device is a digital certificate.

18. The storage medium of claim 13, wherein the digital certificate is an IDevID certificate.

19. The storage medium of claim 13, wherein the first MACsec capable device includes one of a network switch and a network router.

* * * * *